June 30, 1953 — I. SISLIK — 2,643,839

TUBE MOUNT

Filed July 29, 1948

Inventor
Ivan Sislik
By Ramsey, Chisholm & Hilder
Attorney

Patented June 30, 1953

2,643,839

UNITED STATES PATENT OFFICE 2,643,839

TUBE MOUNT

Ivan Sislik, Irvington, N. J., assignor to The Palnut Company, Irvington, N. J., a corporation of New Jersey Application July 29, 1948, Serial No. 41,290

7 Claims. (Cl. 248—27)

This invention relates to tube mounts or structurally similar fittings, and will be disclosed as applied to a fitment useful for mounting an inductance device having an adjustable core. Inductance devices having adjustable cores are used, for example, in radio receivers as transformers, tuning coils and chokes.

The core is provided with a threaded stem that mates with a thread engager formed on the tube mount, and by rotating the stem the core is adjusted longitudinally of the tube. Adjustment of the core may be utilized for such purposes as varying the value of the inductance, modifying the coupling in a transformer, or tuning a circuit in which the inductance is included. Usually it is necessary to make the final adjustment of the core or cores after assembly of the entire piece of equipment in which the inductance device is incorporated. It is also important that the adjustment be secure against vibration or accidental derangement, and that at the same time provision be made for ready adjustments that may become desirable at any later time. Ordinarily the stem of the core is a machine screw of small size, the threads in greatest use today being 6–32 and 4–40. Even with these small threads it is desirable that the thread engager of the tube mount be such as to maintain a holding torque on the stem of one to five ounce-inches throughout twenty adjustments of the core.

A desirable form of tube mount for the above-mentioned purposes is disclosed in United States Patent 2,386,732 issued October 9, 1945, on the invention of Joseph W. Wohlhieter. The mount therein disclosed functions well with threaded stems in which the actual sizes vary only a reasonable amount from the nominal size. However, some users prefer to employ stems having wide variations from the nominal size, such as stems having rolled threads with a range of variation in actual size which is currently designated in the machine screw trade as class 1 tolerance. The present invention is an improvement on the Wohlhieter mount in that the mount of the present invention provides a satisfactory range of holding torque on the stem throughout a wider range of variation of the stem from its nominal size. Also, the mount of the present invention is an improvement on the Wohlhieter mount in that it provides for easier assembly of the mount with a thick chassis plate or the like.

Objects of the present invention are to provide a fitment for mounting a tube, and to provide a fitment for adjustably positioning a threaded stem extending from a tube, in which the fitment satisfactorily grips the stem despite wide variations in stem size from its nominal size.

Another object of the invention is to increase the ease with which a tube-mounting fitment may be telescoped into an apertured chassis plate, particularly a thick plate.

A further object of the invention is to improve the mount of Patent 2,386,732 and structurally similar devices by increasing its capacity to adequately cope with variations in the actual size of the threaded stem.

A still further object of the invention is to improve the mount of Patent 2,386,732 by providing for easier insertion of the mount into a chassis plate, particularly a thick plate.

Further objects, and objects relating to details and economies of construction, manufacture, and use will more definitely appear from the detailed description to follow.

My invention is clearly defined in the claims. In the claims, as well as in the description, parts may at times be identified by specific names for clarity and convenience, but such nomenclature is to be understood as having the broadest meaning consistent with the context and with the concept of my invention as distinguished from the pertinent prior art. Also, in the claims as well as in the description, the mount and its parts are, for clarity and convenience, sometimes referred to on the basis of their oriented position shown in the drawing. However, no limitation as to the positioning of the structure is to be implied, since it will be understood that the mount may be inverted or used in any inclined position. The best form in which I have contemplated applying my invention is illustrated in the drawing forming part of this specification, in which:

Figures 1, 2:
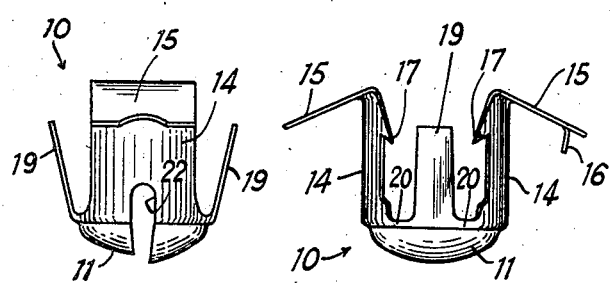
Fig. 1 is a front elevation of the tube mount.
Fig. 2 is an elevation, looking from the left side of Fig. 1.

The fitment, designated as a whole by 10, is generally cup-shaped in form. It is preferably stamped in one piece from a thin untempered spring steel sheet, and then hardened and tempered. The bottom portion 11 of the filtment may be of inverted dome shape and may be formed with an annular seat at 12. Extending upwardly from the bottom 11 at opposite sides thereof are arms 14, 14 of arcuate cross section. At their upper ends these arms merge with wings 15, 15 which extend outwardly and downwardly, notches 13, 13 being provided at the juncture of each wing 15 and the arm 14 to which it is attached. One of the wings 15 is provided with a downwardly projecting finger 16. Each vertical edge of each arm 14 is provided with a tooth 17 which projects inwardly of the horizontal circle established by the inner surface of curvature of the arms 14, 14. At opposite sides of the bottom 11, and located midway between arms 14, 14, there are latching tongues 19, 19 which extend upwardly and outwardly. Between each arm 14 and each tongue 19 the metal may be extended upwardly at 20, so that the fitment will have an annular portion just above the seat 12 which is continuous except where it is traversed by slot 22 which will be referred to presently.

Figure 3:
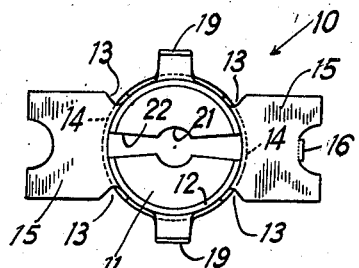
Fig. 3 is a top plan view of the tube mount.
Figure 7:
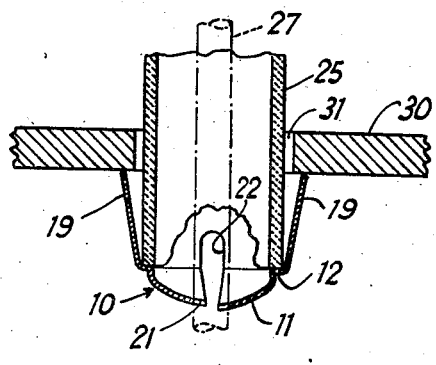
Fig. 7 is a detail sectional view taken generally on the line 7—7 of Fig. 6, a portion of the tube being broken away and the stem being indicated in dot-dash lines.
Figure 4:
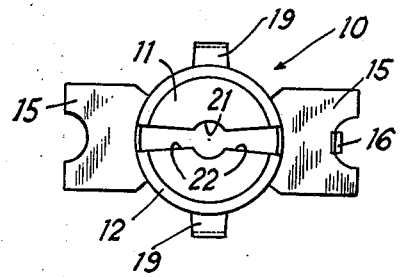
Fig. 4 is a bottom plan view of the tube mount.

The bottom 11 has a central hole 21 the boundary of which is formed as a thread engager adapted to mate with the threaded core stem for which the fitment is designed. This thread engager is preferably formed as a true thread, i. e. the edge of the hole 21 coincides with a helix of the same pitch as the thread of the stem. This pitch of the thread engager is too small to be shown to advantage in the drawings, but it is reflected to some extent in Figs. 2 and 7. A slot 22 extends diametrically of the bottom 11, passing through the hole 21 as best seen in Figs. 3 and 4, and extending for an appreciable distance into each of arms 14 as best seen in Figs. 2 and 7. It will be seen that this slot diametrically severs the bottom 11 in a zone passing through the hole 21 and that the zone of severance extends centrally into each of the vertical arcuate arms 14, 14. While the slot 22 may be made very narrow, it will have some width and therefore it can be conveniently referred to as establishing a zone of severance. As best seen in Figs. 3 and 4, the zone of severance is disposed crosswise to the imaginary zone which extends from one latching tongue 19 to the other latching tongue 19.

The fitment 10 is adapted to mount a tube such as 25, which ordinarily is of non-magnetic material. Some of the tubes used at present are of fibrous material in the nature of impregnated paper, while other tubes now in use are made of molded plastics or synthetic resins. Typically, one or more coils or windings will be wound on the tube as shown diagrammatically in the Wohlhieter patent, previously referred to. Telescoped into the tube 25 is a core 26 which is provided with a threaded stem 27.

In assembly the stem 27 is threaded through the hole 21 and then the tube is telescoped over the core 26, the lower end portion of the tube being telescoped into the fitment 10 until arrested by the end of the tube engaging the seat at 12. Preferably the fitment 10 is so proportioned that the arcuate arms 14, 14 resiliently clasp the tube 25, the four teeth 17 penetrating into the material of the tube.

Figure 5:
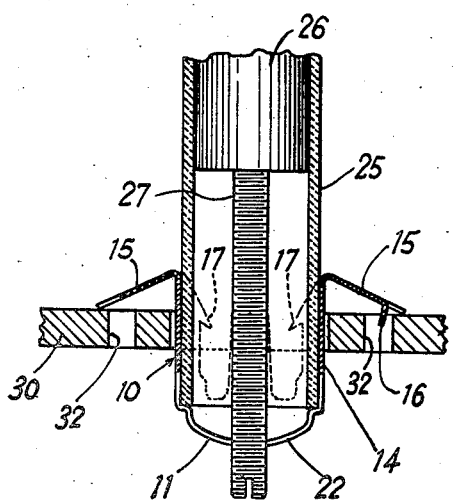
Fig. 5 is a central vertical section showing a tube and core assembled with the mount, the mount being telescoped into a chassis plate preparatory to latching the same thereto. The core and stem are shown in elevation, the showing of the stem being partly diagrammatic.

The assembly of fitment, tube, and core is mounted on a chassis plate as explained in the aforementioned Wohlhieter patent. The chassis plate 30 is provided with an aperture 31 of a size which will conveniently receive the fitment 10. On opposite sides of this aperture there are smaller holes 32, 32. The fitment, carrying the tube 25 and the core 26, is telescoped through the aperture 31, the fitment being so oriented rotationally that the finger 16 will enter one of the holes 32 to hold the assembly against pivotal movement in the hole 31. As the fitment is inserted, latching tongues 19, 19 are cammed inwardly. After the position shown in Fig. 5 has been reached, further telescoping movement into the chassis plate results in upward flexing of the spring wings 15, 15. When the tips of latching tongues 19, 19 pass beneath the plate 30, these tongues spring out to the position shown in Fig. 7 and, when the inserting pressure on the fitment is released, spring wings 15, 15 bias the fitment 10 upwardly so that the tips of latching tongues 19, 19 snugly engage the bottom of the chassis plate.

In some instances the fitment 10 may be inserted into the chassis plate before the tube 25 is inserted into the fitment. However, the tube 25 is ordinarily inserted into the fitment first.

Figure 6:
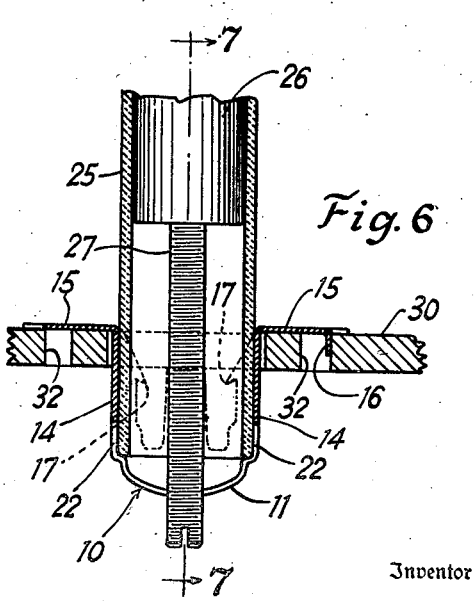
Fig. 6 is a view similar to Fig. 5 but showing the mount latched to the chassis plate.

The chassis plate 30 shown in the drawing represents a plate of the maximum thickness for the particular fitment 10 shown. Thus, in Fig. 6, the wings 15, 15 are substantially flat against the top surface of plate 30. With a thinner chassis plate the wings 15, 15 would be in a condition between that shown in Fig. 5 and that shown in Fig. 6, but in a definitely stressed condition, nevertheless. The flexing of the wings 15, 15, particularly to the condition shown in Fig. 6, is facilitated by the notches 13. Because of these notches each wing 15 is disconnected from its arm 14 in zones which extend inwardly from the side edges of the arm; and this greatly adds to the flexible action of the wing although the length of metal at the juncture of the arm 14 and the wing 15 is sufficient to make a juncture of ample strength.

Hole 21 is made small enough so that its associated thread engager will make a sufficiently tight resilient fit with an undersize stem 27 having the maximum variation from the nominal size. However, the zone of severance completely across the bottom 11 and up into the arms 14, 14 provides for relatively great effective expansion of the hole 21, so that the thread engager can adequately cope with stems 27 which vary, plus or minus, from the nominal stem size by quite large tolerances. Furthermore, the biasing action of the wings 15, 15 against the chassis plate sets up reactive forces against the tips of latching tongues 19, 19, and these reactive forces are such as to urge the two halves of the thread engager against the thread of stem 27. Thus, the fitment of the present invention will not only receive stems which vary from the nominal size by very large tolerances, but will maintain adequate holding torque on such stems throughout repeated adjustments of the core by rotation of the stem in the thread engager.

I claim:

1. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a pair of oppositely-positioned arms of arcuate cross section extending upwardly from the periphery of said bottom portion for clasping the side wall of the tube, having wings extending outwardly from said arms for yieldingly engaging the top surface of said plate when the fitment is telescoped into the aperture therein, and having oppositely-positioned latching tongues located between said arms and extending upwardly from the periphery of said bottom portion in position to engage the under surface of said plate when the fitment is telescoped into the aperture therein; the improvement which comprises: said bottom portion being severed through said hole in a diametrical zone which extends completely across the bottom portion and divides the bottom portion into two segments, and the zone of severance being disposed crosswise of the zone extending from one latching tongue to the other whereby the reactive forces exerted downwardly on the latching tongues by said plate when the fitment is mounted in the aperture therein act to urge the two segments of the bottom portion toward one another and establish substantial frictional engagement with the threaded stem.

2. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a pair of oppositely-positioned arms of arcuate cross section extending upwardly from the periphery of said bottom portion for clasping the side wall of the tube, having wings extending outwardly from said arms for yieldingly engaging the top surface of said plate when the fitment is telescoped into the aperture therein, and having oppositely-positioned latching tongues located between said arms and extending upwardly from the periphery of said bottom portion in position to engage the under surface of said plate when the fitment is telescoped into the aperture therein; the improvement which comprises: said bottom portion being severed through said hole in a diametrical zone which extends completely across the bottom portion and divides the bottom portion into two segments, the zone of severance being disposed crosswise of the zone extending from one latching tongue to the other whereby the reactive forces exerted downwardly on the latching tongues by said plate when the fitment is mounted in the aperture therein act to urge the two segments of the bottom portion toward one another and establish substantial frictional engagement with the threaded stem, and the severance extending up into each of said arms of arcuate cross section whereby the structure is rendered more yielding in response to the forces which urge the two segments of the bottom portion toward one another.

3. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a pair of oppositely-positioned arms of arcuate cross section extending upwardly from the periphery of said bottom portion for clasping the side wall of the tube, having wings extending outwardly from said arms for yieldingly engaging the top surface of said plate when the fitment is telescoped into the aperture therein, and having oppositely-positioned latching tongues located between said arms and extending upwardly from the periphery of said bottom portion in position to engage the under surface of said plate when the fitment is telescoped into the aperture therein; the improvement which comprises: said bottom portion being severed through said hole in a diametrical zone which extends completely across the bottom portion and divides the bottom portion into two segments, the zone of severance being disposed crosswise of the zone extending from one latching tongue to the other whereby the reactive forces exerted downwardly on the latching tongues by said plate when the fitment is mounted in the aperture therein act to urge the two segments of the bottom portion toward one another and establish substantial frictional engagement with the threaded stem, the severance extending up into each of said arms of arcuate cross section whereby the structure is rendered more yielding in response to the forces which urge the two segments of the bottom portion toward one another, and said wings being disconnected from said arms in zones extending inwardly from the side edges of the arms.

4. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a plurality of arms disposed about said bottom portion in circumferentially-spaced relation and extending upwardly from the periphery of the bottom portion for clasping the side wall of the tube, having wings extending outwardly from said arms for yieldingly engaging the top surface of said plate when the fitment is telescoped into the aperture therein, and having a plurality of latching tongues disposed about said bottom portion in circumferentially-spaced relation and interspersed with said arms, said tongues extending upwardly from the periphery of the bottom portion in position to engage the under surface of said plate when the fitment is telescoped into the aperture therein; the improvement which comprises: said bottom portion having a zone of severance passing through said hole, the zone of severance extending to the periphery of the bottom portion and substantially dividing the bottom portion into two segments, and the zone of severance being disposed crosswise of a zone extending from one latching tongue to another whereby the reactive forces exerted downwardly on such latching tongues by said plate when the fitment is mounted in the aperture therein act to urge the two segments of the bottom portion toward one another and establish substantial frictional engagement with the threaded stem.

5. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a plurality of arms disposed about said bottom portion in circumferentially-spaced relation and extending upwardly from the periphery of the bottom portion for clasping the side wall of the tube, having wings extending outwardly from said arms for yieldingly engaging the top surfaces of said plate when the fitment is telescoped into the aperture therein, and having a plurality of latching tongues disposed about said bottom portion in circumferentially-spaced relation and interspersed with said arms, said tongues extending upwardly from the periphery of the bottom portion in position to engage the under surface of said plate when the fitment is telescoped into the aperture therein; the improvement which comprises: said bottom portion having a zone of severance passing diametrically through said hole and substantially dividing the bottom portion into two segments, the zone of severance being disposed crosswise of a zone extending from one latching tongue to another whereby the reactive forces exerted downwardly on such latching tongues by said plate when the fitment is mounted in the aperture therein act to urge the two segments of the bottom portion toward one another and establish substantial frictional engagement with the threaded stem, and the severance extending up into at least one of said arms whereby the structure is rendered more yielding in response to the forces which urge the two segments of the bottom portion toward one another.

6. In a one-piece fitment of springy sheet metal for attaching a tube to an apertured plate and for adjustably positioning a threaded stem extending into the tube, said fitment having a bottom portion provided with a central hole the boundary of which is formed as female thread means for screw-threaded mating with the stem, having a plurality of arms disposed about said bottom portion in circumferentially-spaced relation and extending upwardly from the periphery of the bottom portion for clasping the side wall of the tube, having wings extending outwardly from said arms for yieldingly engaging the top surface of said plate when the fitment is telescoped into the aperture therein, and having a plurality of latching tongues disposed about said bottom portion in circumferentially-spaced relation and interspersed with said arms, said tongues extending upwardly from the periphery of the bottom portion in position to engage the under surface of said plate when the fitment is telescoped into the aperture therein; the improvement which comprises: said bottom portion having a zone of severance passing diametrically through said hole and substantially dividing the bottom portion into two segments, the zone of severance being disposed crosswise of a zone extending from one latching tongue to another whereby the reactive forces exerted downwardly on such latching tongues by said plate when the fitment is mounted in the aperture therein act to urge the two segments of the bottom portion toward one another and establish substantial frictional engagement with the threaded stem, the severance extending up into at least one of said arms whereby the structure is rendered more yielding in response to the forces which urge the two segments of the bottom portion toward one another, and said wings being disconnected from said arms in zones extending inwardly from the side edges of the arms.

7. In a one-piece fitment of springy material for attaching a tube to an apertured plate and for adjustably positioning a threaded stem extending into the tube, said fitment having a bottom portion provided with a central hole the boundary of which is formed as female thread means for screw-threaded mating with the stem, having a pair of oppositely-positioned arms of arcuate cross section extending upwardly from the periphery of said bottom portion for clasping the side wall of the tube, having wings extending outwardly from said arms for yieldingly engaging the top surface of said plate when the fitment is telescoped into the aperture therein, and having oppositely-positioned latching tongues located between said arms and extending upwardly from the periphery of said bottom portion in position to engage the under surface of said plate when the fitment is telescoped into the aperture therein; the improvement which comprises: said bottom portion being severed through said hole in a diametrical zone which extends at least substantially across the bottom portion and substantially divides the bottom portion into two segments, the zone of severance being disposed crosswise of the zone extending from one latching tongue to the other whereby the reactive forces exerted downwardly on the latching tongues by said plate when the fitment is mounted in the aperture therein act to urge the two segments of the bottom portion toward one another and establish substantial frictional engagement with the threaded stem, and the severance extending up into at least one of said arms of arcuate cross section whereby the structure is rendered more yielding in response to the forces which urge the two segments of the bottom portion toward one another.

IVAN SISLIK.

References Cited in the file of this patent

UNITED STATES PATENTS

| Number | Name | Date |
| --- | --- | --- |
| 2,386,732 | Wohlhieter | Oct. 9, 1945 |
| 2,404,236 | Kost | July 16, 1946 |
| 2,455,891 | Flanagan | Dec. 7, 1948 |
| 2,468,333 | Johnson | Apr. 26, 1949 |
| 2,496,866 | Flora | Feb. 7, 1950 |
| 2,503,219 | Schaper | Apr. 4, 1950 |
| 2,539,172 | Andrews | Jan. 23, 1951 |